United States Patent
Khasnis et al.

(10) Patent No.: US 10,572,253 B2
(45) Date of Patent: Feb. 25, 2020

(54) SYSTEM AND METHOD FOR REDUCING NON-LINEARITY IN MIXED SIGNAL PROCESSING USING COMPLEX POLYNOMIAL VECTOR PROCESSOR

(71) Applicant: Signalchip Innovations Private Limited, Bangalore (IN)

(72) Inventors: Himamshu Gopalakrishna Khasnis, Bangalore (IN); Sukrutha Bharadwaj Hebbagilu Krishna, Bangalore (IN)

( * ) Notice: Subject to any disclaimer, the term of this patent is extended or adjusted under 35 U.S.C. 154(b) by 140 days.

(21) Appl. No.: 15/969,356

(22) Filed: May 2, 2018

(65) Prior Publication Data
US 2018/0321941 A1    Nov. 8, 2018

(30) Foreign Application Priority Data
May 2, 2017 (IN) .............................. 201741015549

(51) Int. Cl.
*G06F 9/30* (2018.01)
*G06F 15/80* (2006.01)
*G06F 7/544* (2006.01)

(52) U.S. Cl.
CPC .......... *G06F 9/30036* (2013.01); *G06F 7/544* (2013.01); *G06F 9/3001* (2013.01); *G06F 9/30134* (2013.01); *G06F 15/8053* (2013.01); *G06F 15/8076* (2013.01)

(58) Field of Classification Search
None
See application file for complete search history.

(56) References Cited

U.S. PATENT DOCUMENTS

| | | | |
|---|---|---|---|
| 7,538,773 B1 * | 5/2009 | Hutchins | G06T 15/005 345/506 |
| 7,609,754 B2 * | 10/2009 | Fulghum | H04B 1/712 375/148 |
| 7,676,535 B2 * | 3/2010 | Donofrio | G06F 7/535 708/495 |
| 2008/0232445 A1 * | 9/2008 | Forsell | G06F 9/5066 375/219 |

* cited by examiner

*Primary Examiner* — Corey S Faherty
(74) *Attorney, Agent, or Firm* — The Law Office of Austin Bonderer, PC; Austin Bonderer

(57) ABSTRACT

A system for reducing non-linearity in mixed signal processing using complex polynomial vector processor 102 is provided. The complex polynomial vector processor 102 includes a data processing unit (104) and a co-efficient feeder unit (106). The data processing unit (104) converts a high-speed data stream into a polar-like format (PL) data and calculates required polynomial powers for the high-speed data stream using the PL format data. The data processing unit (104) includes a multiplier accumulator (MAC) unit (206) that generates processed high-speed data and a delay unit (208) that combines time separated input with the processed high-speed data to generate output data with reduced non-linearity.

11 Claims, 4 Drawing Sheets

SYSTEM AND METHOD FOR REDUCING NON-LINEARITY IN MIXED SIGNAL PROCESSING USING COMPLEX POLYNOMIAL VECTOR PROCESSOR

BACKGROUND

Technical Field

The embodiments herein generally relate to a complex polynomial vector processor, and more particularly, to a system and method for reducing non-linearity in mixed signal processing using a complex polynomial vector processor.

Description of the Related Art

Signal processing is used virtually in every type of electronic device ranging from satellite communication systems to digital cameras. Many algorithms in signal processing assume the device operating linearly for best performance. In reality, most of the devices will go out of linear range in high performance condition. Thus, method of linearizing via post processing or pre-processing of the signals is required. In order to correct for the non-linearity, exact device modules are required at the time of operation. Also, the modules parameters may vary according to the environment. Coming up the fixed algorithmic solution to solve real time problems might not be the best way and also will end up using lot of hardware resources.

Thus, a need still remains for correction for nonlinearity in mixed signal processing. In view of the increasing use of mixed signal processing, it is becoming increasingly critical that answers be found to these problems. Accordingly, there remains a need for a system for reducing the effect of non-linearity in the mixed signal processing.

SUMMARY

In view of the foregoing, an embodiment herein provides a system for processing high-speed data stream to reduce non-linearity in a mixed signal processing design. The system includes a complex polynomial vector processor. The complex polynomial vector processor includes a data processing unit and a co-efficient feeder unit. The co-efficient feeder unit calculates a co-efficient for a polynomial. The co-efficient feeder unit includes an instruction memory, an instruction decoder and a clock gater unit. The instruction memory includes a Very Long Instruction Word (VLIW) to configure a gain to the high-speed data stream. The high-speed data stream includes a complex polynomial. The instruction decoder is connected with the instruction memory to read a next instruction from the instruction memory to provide the co-efficient for the complex polynomial. The clock gater unit controls the co-efficient feeder to reduce a size of the instruction memory. The data processing unit processes a high-speed data stream in a mixed signal processing design to calculate polynomial terms to increase a processing speed and to reduce the non-linearity. The data processing unit includes a normalized cordic transform unit, a polynomial power calculation unit, a multiplier accumulator (MAC), a delay unit, one or more programmable gains, a programmable attenuator, an inverse cordic transform unit and a co-efficient update unit. The normalized cordic transform unit converts the high-speed data stream into a polar-like format (PL format) data to obtain PL format data. The high-speed data stream includes complex numbers which are amplified before converting into PL format data. The PL format data includes (i) a normalized theta reduces the complexity of accumulators and (ii) real data is applied to a shift register and sigma delta Digital to Analog Converter (DAC) to track an envelope of a power amplifier of the complex polynomial vector processor. The polynomial power calculation unit calculates required polynomial power in the high-speed data stream based on the co-efficient of the complex polynomial and the PL format data. The co-efficient of the complex polynomial is obtained from the co-efficient update unit. The co-efficient update unit is connected with the co-efficient feeder unit for receiving the co-efficient of the complex polynomial. The MAC (multiplier accumulator) unit processes the calculated polynomial power to generate a processed high-speed data. The MAC unit receives the calculated polynomial powers from the polynomial power calculation unit through the one or more programmable gains. The calculated polynomial power is received from the polynomial power calculation unit through one or more programmable gains. The one or more programmable gains coarse scales the co-efficient of the complex polynomial. The delay unit combines the processed high-speed data with time separated input to generate output data. The co-efficient update unit applies a fine scaling to the co-efficient of the complex polynomial in at least one of the polynomial power calculation unit, the MAC unit or the delay unit. The polynomial co-efficient provided to at least one of the polynomial power calculation unit, the MAC unit or a delay unit to remove maintenance of a shadow memory unit of the complex polynomial vector processor.

The data processing unit includes an inverse cordic transform unit that is connected to the MAC unit and the delay unit to convert the output data generated by the delay unit into the Cartesian format from the PL format to obtain the Cartesian format output data with reduced non-linearity.

In an embodiment, the high-speed data stream is provided to the one or more programmable gains before and after entering to the normalized cordic transform unit to increase an accuracy of the PL format bits for lesser amount of computations.

In another embodiment, the data processing unit includes a programmable attenuator and a programmable amplification unit to perform programmable attenuation and programmable amplification respectively on the high-speed data stream to reduce fixed point quantization errors of the MAC unit using the one or more programmable gains.

In yet another embodiment, the mixed signal processing design includes a digital filter-Digital to Analog Converter-power amplifier (DAC-PA) chain for reducing non-linearity in the output data.

In yet another embodiment, the generated output data with reduced non-linearity is applied to at least one of Finite Impulse Response (FIR) filters or DAC-PA chain for further processing.

In an aspect, a method to process a high-speed data to reduce non-linearity in a mixed signal processing design is provided. The method includes the steps of configuring, using an instruction memory, a gain to the high-speed data stream using a Very Long Instruction Word (VLIW), wherein the high-speed data stream comprises a complex polynomial; reading a next instruction from the instruction memory to provide a co-efficient for the complex polynomial using an instruction decoder; calculating, using the co-efficient feeder unit, a co-efficient for the complex polynomial and transmitting the calculated co-efficient to a co-efficient update unit; converting, using a normalized cordic transform unit, the high-speed data stream into a polar-like (PL) format to obtain PL format data; calculating, using a polynomial power calculation unit, required polynomial power for the high-speed data stream based on the co-efficient of the complex polynomial and the PL format data, wherein the co-efficient of the complex polynomial is obtained from the co-efficient update unit; receiving the calculated polynomial powers from the polynomial power calculation unit using one or more programmable gains; generating processed high-speed data by processing the calculated polynomial powers; generating output data by combining the processed high-speed data with time separated input and converting the output data generated by the delay unit to the Cartesian format from the PL format using an inverse cordic transform unit to obtain the Cartesian format output data with reduced non-linearity. The complex polynomial of the high-speed data stream are amplified before converting into PL format data. The PL format data comprises (i) a normalized theta that reduces complexity of accumulators of the complex polynomial vector processor and (ii) a real data that is applied to a shift register and a sigma delta Digital to Analog Converter (DAC) of the complex polynomial vector processor to track an envelope of a power amplifier of the complex polynomial vector processor. The one or more programmable gains coarse scales the co-efficient of the complex polynomial using a multiplier accumulator. The co-efficient update unit applies a fine scaling to the co-efficient of the complex polynomial in at least one of the polynomial power calculation unit, the MAC unit or the delay unit. The polynomial co-efficient is provided to at least one of the polynomial power calculation unit the MAC unit or a delay unit to remove maintenance of a shadow memory unit of the complex polynomial vector processor.

In an embodiment, providing the high-speed data stream to the one or more programmable gains before and after entering to the normalized cordic transform unit to increase an accuracy of the PL format bits for lesser amount of computations.

In another embodiment, performing a programmable amplification unit a programmable attenuation and a programmable amplification respectively on the high-speed data stream to reduce fixed point quantization errors of the MAC unit using the one or more programmable gains using a programmable attenuator.

In yet another embodiment, the mixed signal processing design comprises a digital filter-Digital to Analog Converter-power amplifier (DAC-PA) chain for reducing non-linearity in the output data.

In yet another embodiment, applying the generated output with reduced non-linearity to at least one of Finite Impulse Response (FIR) filters or DAC-PA chain using delay unit for further processing.

In yet another embodiment, controlling the co-efficient feeder (106) to reduce a size of the instruction memory using a clock gater unit.

The system reduces the power consumption of all the blocks in the complex polynomial vector processor using the clock gater. The polynomial coefficients may be loaded either before the start of processing or dynamically in between while the complex polynomial vector processor is in operation. This system eliminates a need to maintain a shadow memory unit for the polynomial coefficients which otherwise would result in increased memory area. The coefficients for the complex polynomials may be calculated offline or may be dynamically calculated based on the performance of the DAC-PA chain with algorithms such as least mean square, Recursive Least Squares, etc. Intermediate updates to the system do not create any stability issues as a whole architecture of the system is feed forward.

The input data stream may be pre-corrected for the non-linearity before being fed into the DAC-PA chain. The system may correct the input data stream for the non-linearity and thereby increasing the range of operation. The system may calculate selective terms of the polynomial for increasing processing speed. The amplified high-speed data stream is sent to normalize cordic to achieve higher accuracy with minimum iteration. The normalized cordic conversion is possible for lesser area of MAC unit. The processing of the polynomial coefficients may be done dynamically while the complex polynomial vector processor is in operation.

BRIEF DESCRIPTION OF THE DRAWINGS

The embodiments herein will be better understood from the following detailed description with reference to the drawings, in which.

Figure 1:
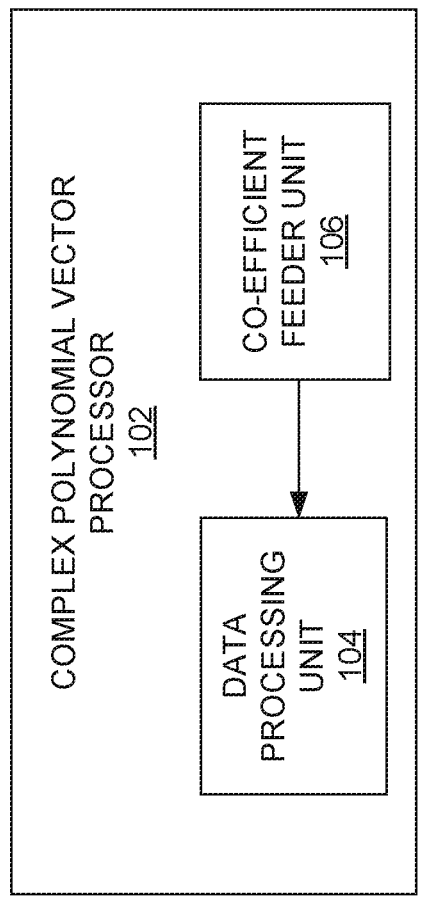
FIG. 1 illustrates a system view of a complex polynomial vector processor to reduce non-linearity in a mixed signal processing design according to an embodiment herein.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method to reduce for non-linearity in mixed signal processing. The embodiments herein achieve this by providing a complex polynomial vector processor that reduces the non-linearity in the mixed signal processing. The complex polynomial vector processor is designed to solve complex polynomials for high-speed data stream to correct/reduce the non-linearity in the mixed signal processing. Referring now to the drawings, and more particularly to FIGS. 1 through 3B, where similar reference characters denote corresponding features consistently throughout the figures, there are shown preferred embodiments.

FIG. 1 illustrates a system view of a complex polynomial vector processor to reduce non-linearity in a mixed signal processing design according to an embodiment herein. The complex polynomial vector processor 102 includes a data processing unit 104 and a co-efficient feeder unit 106. The co-efficient feeder unit 106 calculates a co-efficient for a complex polynomial. The co-efficient feeder unit 106 configures a gain for the high-speed data stream. In an embodiment, the high-speed data stream includes a complex polynomial. The data processing unit 104 obtains the high-speed data stream through a mixed signal processing design. In an embodiment, the mixed signal processing design may include a digital filter-Digital to Analog Converter-power amplifier (DAC-PA) chain for reducing non-linearity. The data processing unit 104 converts the high-speed data stream into a polar-like (PL) format to obtain PL format data. The PL format data includes a normalized theta and real data. The normalized theta reduces the complexity of accumulators of the complex polynomial vector processor (102). The real data is applied to a shift register and a sigma delta Digital to Analog Converter (DAC) to track an envelope of a power amplifier. The data processing unit 104 calculates required polynomial powers for the high-speed data stream based on the co-efficient of the complex polynomial and the PL format data. In an embodiment, the calculated polynomial powers may be used to reverse the initial amplification of the high-speed data stream. The data processing unit 104 may obtain the co-efficient of the complex polynomial from the co-efficient feeder unit 106.

The data processing unit 104 generates a processed high-speed data by processing the calculated polynomial powers of the high-speed data stream. The data processing unit 104 combines the processed high-speed data with the time separated input to generate output data. The data processing unit 104 converts the generate output into the Cartesian format from the PL format to obtain the Cartesian format output data with reduced non-linearity.

Figure 2:
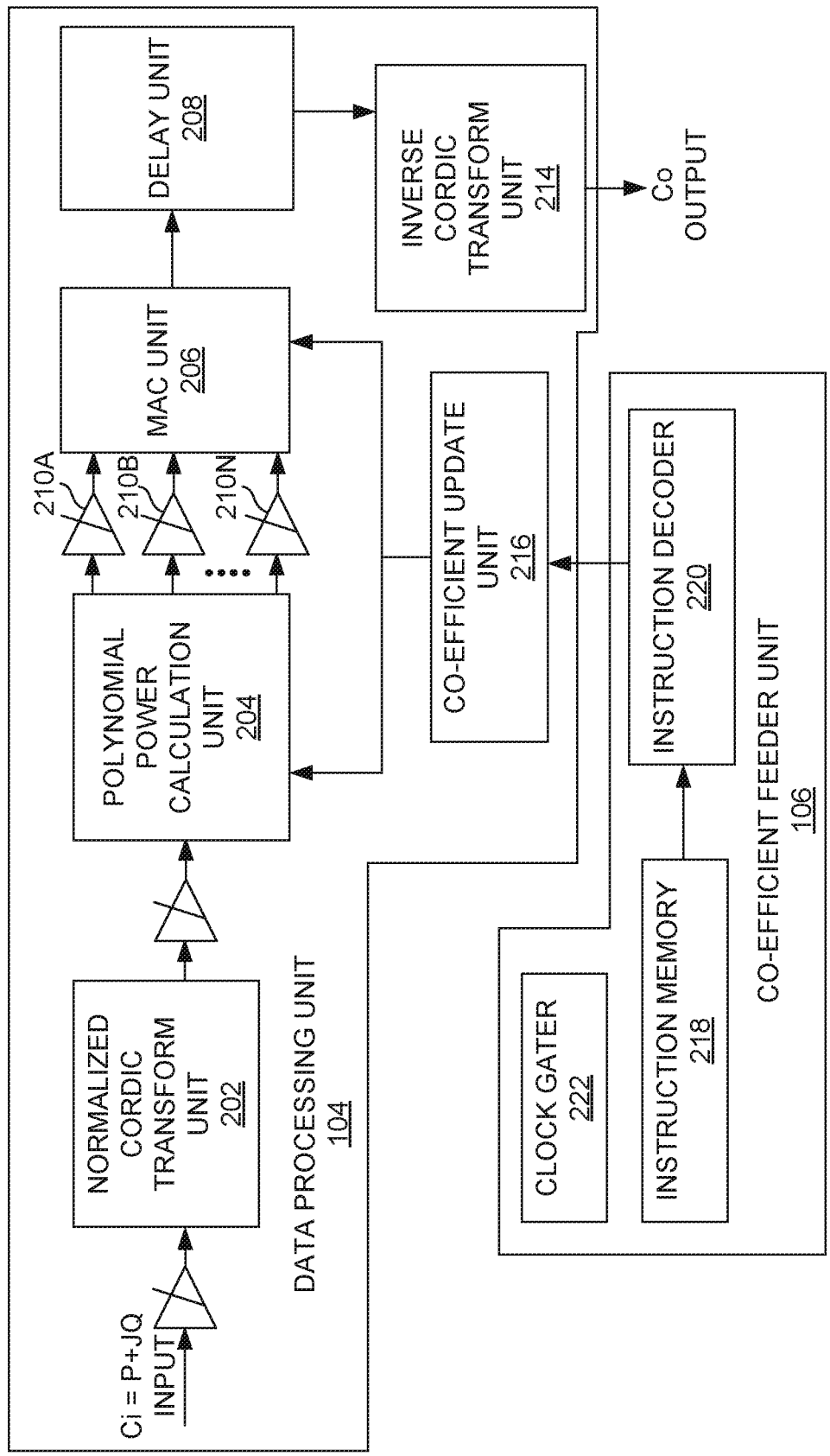
FIG. 2 illustrates an exploded view of the complex polynomial vector processor of FIG. 1 according to an embodiment herein.

FIG. 2 illustrates an exploded view of the complex polynomial vector processor 102 of FIG. 1 according to an embodiment herein. The data processing unit 104 includes a normalized cordic transform unit 202, a polynomial power calculation unit 204, a multiplier accumulator (MAC) unit 206, a delay unit 208, one or more programmable gains 210A-N, an inverse cordic transform unit 214 and a co-efficient update unit 216. The co-efficient feeder unit 106 includes an instruction memory 218, an instruction decoder 220 and clock gater 222. The co-efficient feeder unit 106 calculates a co-efficient for a complex polynomial and transmits the calculated co-efficient to the co-efficient update unit 216. The instruction memory 218 includes a Very Long Instruction Word (VLIW). The VLIW configures a gain for the high-speed data stream. The high-speed data stream may include a complex polynomial. In an embodiment, the VLIW handles any polynomial expression with pure and cross terms. The VLIW instruction set provides ability to configure gain to all the terms of the complex polynomials. The simultaneous application of the polynomial co-efficient maintains throughput of the output high-speed data stream to the input high-speed data stream. The instruction decoder 220 reads a next instruction from the instruction memory 218 to provide the co-efficient for the complex polynomial and transmits the calculated co-efficient to the co-efficient update unit 216. In an embodiment, the instruction memory 218 and instruction decoder 220 manipulates the calculation of polynomial powers. The clock gater 222 controls the co-efficient feeder (106) to reduce a size of the instruction memory 218. In an embodiment, the clock gater unit 222 is fed to the complex polynomial vector processor 102 that is gated when the complex polynomial vector processor 102 is in idle to reduce the power consumption of all the blocks in the complex polynomial vector processor 102.

The normalized cordic transform unit 202 converts the high-speed data stream into the PL format to obtain PL format data. The complex polynomial of the high-speed data stream may be amplified before converting into PL format data. In an embodiment, the PL format data includes a normalized theta and real data. The normalized theta reduces the complexity of accumulators. The real data is applied to a shift register and a sigma delta Digital to Analog Converter (DAC) to track an envelope of a power amplifier. The polynomial power calculation unit 204 calculates required polynomial powers for the high-speed data stream based on the co-efficient of the complex polynomial and the PL format data. In an embodiment, the co-efficient of the complex polynomial is obtained from a co-efficient update unit 216. The polynomial powers are passed through one or more programmable gains 210A-N that is known as a coarse scaling.

The co-efficient update unit 216 applies a fine scaling to the co-efficient of the polynomial received from the co-efficient feeder unit 106. The high-speed data stream is applied to the one or more programmable gains 210A-N before and after entering to the normalized cordic transform unit 202 to increase an accuracy of the PL format bits for lesser amount of computations. The calculated polynomial powers are passed through the programmable attenuator to reverse the initial amplification of the high-speed data stream. In an embodiment, the signal strength of each polynomial power terms may be configured independently. In another embodiment, complex polynomials of the high-speed data stream are passed through a programmable attenuator (not shown in Fig.) and a programmable amplification unit (not shown in Fig.) using the one or more programmable gains 210A-N to reduce fixed point quantization errors of the MAC unit 206. The MAC unit 206 processes the calculated polynomial powers to generate processed high-speed data. In an embodiment, the MAC unit 206 receives calculated polynomial powers from the polynomial power calculation unit 204 through one or more programmable gains 210A-N. The delay unit 208 combines the processed high-speed data generated by the MAC unit 206 with time separated input by to generate output data. The inverse cordic transform unit 214 converts the output into a Cartesian format from the PL format data to obtain the Cartesian format output data with reduced non-linearity. In an embodiment, inverse cordic transform unit 214 is connected next to the MAC unit 206 and the delay unit 208. In another embodiment, the generated output data with reduced non-linearity is applied on at least one of Finite Impulse Response (FIR) filters or DAC-PA chain for further processing. In another embodiment, the programmable amplification using the one or more programmable gains 210A-N and the programmable attenuation using the programmable attenuator helps to maintain a fixed point bit width of the MAC unit 206 to a minimum and independent configurability of various peaks to average power ratios in the high-speed data stream (e.g. input data stream) with minimum bit width.

Figure 3A:
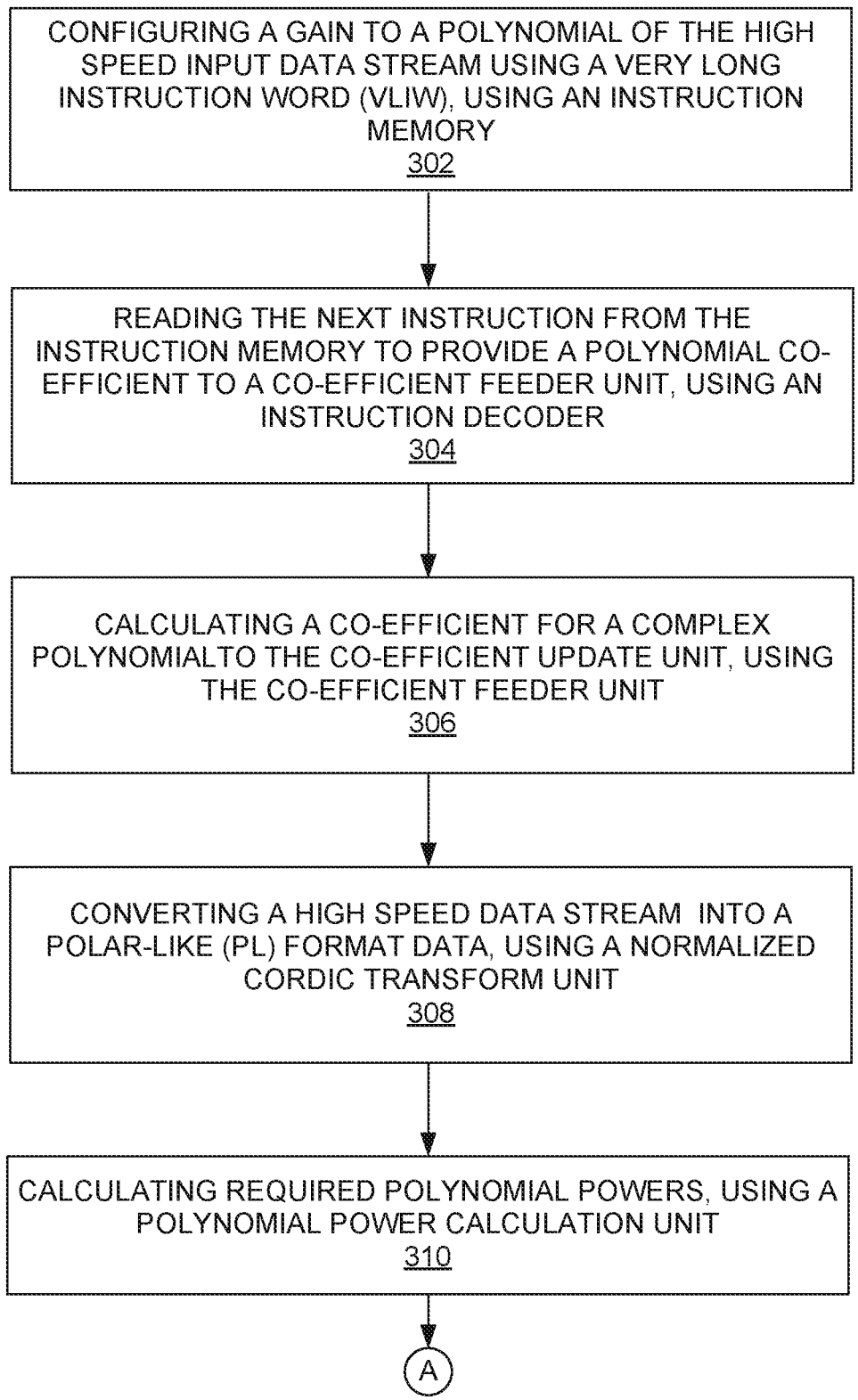
FIGS. 3A and 3B illustrate a method of reducing non-linearity in mixed signal processing using a complex polynomial vector processor of FIG. 1 according to an embodiment herein.
Figure 3B:
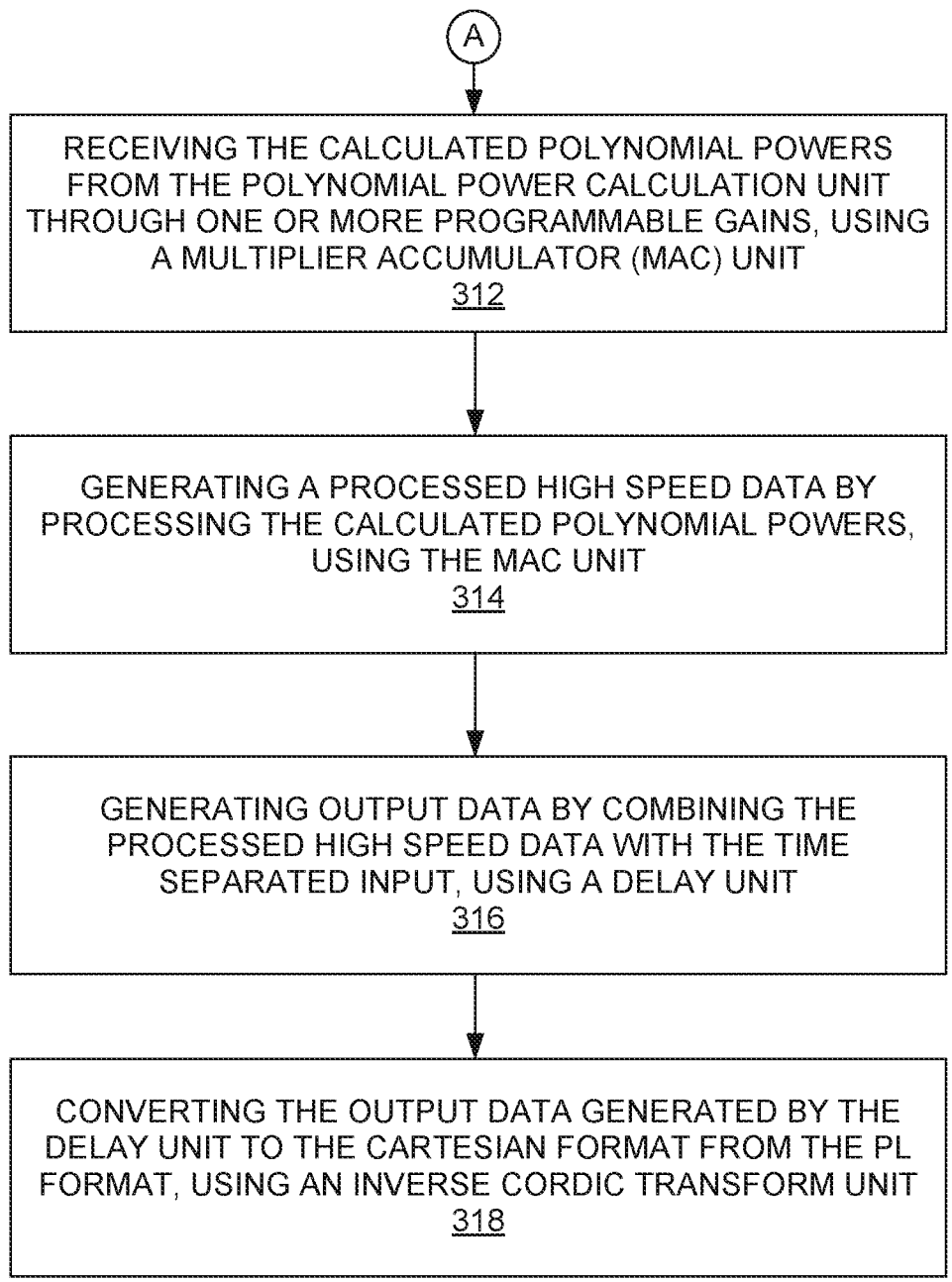

FIGS. 3A and 3B illustrates a method of reducing non-linearity in mixed signal processing using the complex polynomial vector processor 102 of FIG. 1 according to an embodiment herein. At step 302, a gain is configured for the high-speed data stream using the instruction memory 218. In an embodiment, the high-speed data stream comprises a complex polynomial. At step 304, a next instruction from the instruction memory 218 is read using instruction decoder 220 to provide a polynomial co-efficient to a co-efficient feeder unit 106. At step 306, a co-efficient for the complex polynomial is calculated and the calculated co-efficient is transmitted to the co-efficient update unit 216 using the co-efficient feeder unit 106. At step 308, the high-speed data stream is converted into the polar-like format (PL) to obtain PL format data using the normalized cordic transform unit 202. At step 310, required polynomial powers for the high-speed data stream is calculated based on the co-efficient of the complex polynomial and the PL format data using the polynomial power calculation unit 204.

In an embodiment, the co-efficient update unit 216 applies a fine scaling to the co-efficient of the polynomial in the polynomial power calculation unit 204. A coarse scaling is applied to the polynomial powers using the one or more programmable gains 210A-N. At step 312, the MAC unit 206 receives the calculated polynomial power from the polynomial power calculation unit 204 through the one or more programmable gains 210A-N. At step 314, the MAC unit 206 generates processed high-speed data using by processing the calculated polynomial powers. At step 316, the processed high-speed data is combined with time separated input to generate output data using delay unit 208. At step 318, the output generated by the delay unit 208 is converted into a Cartesian format from the PL format using the inverse cordic transform unit 214 to obtain the Cartesian format output data with reduced non-linearity.

In an embodiment, the high-speed data stream is applied to the one or more programmable gains 210A-N before and after entering to the normalized cordic transform unit 202 to increase an accuracy of the PL format bits for lesser amount of computations. The complex polynomials of the high-speed data stream are passed to the programmable amplification unit using the one or more programmable gains 210A-N to reduce fixed point quantization errors of the MAC unit 206. The clock gater 222 reduces a size of the instruction memory 218 by controlling the co-efficient feeder unit 106. In another embodiment, the generated output with reduced non-linearity is applied to at least one of Finite Impulse Response (FIR) filters or DAC-PA chain for further processing.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with various types of modifications.

We claim:
1. A system for processing high-speed data stream to reduce non-linearity in a mixed signal processing design, wherein the system comprising:
   a complex polynomial vector processor (102) that comprises
   (i) a co-efficient feeder unit (106) that calculates co-efficient for a polynomial, wherein the co-efficient feeder unit (106) comprises
      (a) an instruction memory (218) that comprises a Very Long Instruction Word (VLIW) to configure a gain for the high-speed data stream, wherein the high-speed data stream comprises a complex polynomial;
      (b) an instruction decoder (220) that is connected with the instruction memory (218) to read a next instruction from the instruction memory (218) to provide a co-efficient for the complex polynomial; and
      (c) a clock gater unit (222) that controls the co-efficient feeder (106) to reduce a size of the instruction memory (218); and
   (ii) a data processing unit (104) that processes the high-speed data stream in the mixed signal processing design for (i) increasing a processing speed and (ii) reducing non-linearity, wherein the data processing unit (104) comprises,
      (a) a normalized cordic transform unit (202) that converts the high-speed data stream into a polar-like (PL) format to obtain PL format data, wherein the complex polynomial of the high-speed data stream are amplified before converting into PL format data, wherein the PL format data comprises (i) a normalized theta that reduces complexity of accumulators of the complex polynomial vector processor (102) and (ii) real data that is applied to a shift register and a sigma delta Digital to Analog Converter (DAC) of the complex polynomial vector processor (102) to track an envelope of a power amplifier of the complex polynomial vector processor (102);
      (b) a polynomial power calculation unit (204) that calculates required polynomial power for the high-speed data stream based on the co-efficient of the complex polynomial and the PL format data, wherein the co-efficient of the complex polynomial is obtained from a co-efficient update unit (216), wherein the co-efficient update unit (216) is connected with the co-efficient feeder unit (106) for receiving the co-efficient of the complex polynomial;
      (c) a multiplier accumulator (MAC) unit (206) that processes the calculated polynomial power to generate processed high-speed data, wherein the MAC unit (206) receives the calculated polynomial powers from the polynomial power calculation unit (204) through one or more programmable gains (210A-N), wherein the one or more programmable gains (210A-N) coarse scales the co-efficient of the complex polynomial;
      (d) a delay unit (208) that combines the processed high-speed data with time separated input to generate output data, wherein the co-efficient update unit (216) applies a fine scaling to the co-efficient of the polynomial in at least one of the polynomial power calculation unit (204), the MAC unit (206) or the delay unit (208), wherein the polynomial co-efficient provided to at least one of the polynomial power calculation unit (204), the MAC unit (206) or a delay unit (208) to remove a maintenance of a shadow memory unit of the complex polynomial vector processor (102); and

(e) an inverse cordic transform unit (214) that is connected to the MAC unit (206) and the delay unit (208) to convert the output data generated by the delay unit (208) to a Cartesian format from the PL format to obtain the Cartesian format output data with reduced non-linearity.

2. The system as claimed in claim 1, wherein the high-speed data stream is provided to the one or more programmable gains (210A-N) before and after entering to the normalized cordic transform unit (202) to increase an accuracy of the PL format bits for lesser amount of computations.

3. The system as claimed in claim 1, wherein the data processing unit (104) comprises a programmable attenuator and a programmable amplification unit to perform programmable attenuation and programmable amplification respectively on the high-speed data stream to reduce fixed point quantization errors of the MAC unit (206) using the one or more programmable gains (210A-N).

4. The system as claimed in claim 1, wherein the mixed signal processing design comprises a digital filter-Digital to Analog Converter-power amplifier (DAC-PA) chain for reducing non-linearity in the output data.

5. The system as claimed in claim 1, wherein the generated output data with reduced non-linearity is applied to at least one of Finite Impulse Response (FIR) filters or DAC-PA chain for further processing.

6. A method to process a high-speed data to reduce non-linearity in a mixed signal processing design comprising, configuring, using an instruction memory (218), a gain for the high-speed data stream using a Very Long Instruction Word (VLIW), wherein the high-speed data stream comprises a complex polynomial;

reading, using an instruction decoder (220), a next instruction from the instruction memory (218) to provide a co-efficient for the complex polynomial;

calculating, using the co-efficient feeder unit (106), a co-efficient for the complex polynomial and transmitting the calculated co-efficient to a co-efficient update unit (216);

converting, using a normalized cordic transform unit (202), the high-speed data stream into a polar-like (PL) format to obtain PL format data, wherein the complex polynomial of the high-speed data stream are amplified before converting into PL format data, wherein the PL format data comprises (i) a normalized theta that reduces complexity of accumulators of the complex polynomial vector processor (102) and (ii) a real data that is applied to a shift register and a sigma delta Digital to Analog Converter (DAC) of the complex polynomial vector processor (102) to track an envelope of a power amplifier of the complex polynomial vector processor (102);

calculating, using a polynomial power calculation unit (204), required polynomial power for the high-speed data stream based on the co-efficient of the complex polynomial and the PL format data, wherein the co-efficient of the complex polynomial is obtained from the co-efficient update unit (216);

receiving, using one or more programmable gains (210A-N), the calculated polynomial powers from the polynomial power calculation unit (204);

generating, using a multiplier accumulator (MAC) unit (206), processed high-speed data by processing the calculated polynomial powers, wherein the MAC unit (206) receives the calculated polynomial powers from the polynomial power calculation unit (204) through one or more programmable gains (210A-N), wherein the one or more programmable gains (210A-N) coarse scales the co-efficient of the complex polynomial;

generating, using a delay unit (208), output data by combining the processed high-speed data with time separated input, wherein the co-efficient update unit (216) applies a fine scaling to the co-efficient of the complex polynomial in at least one of the polynomial power calculation unit (204), the MAC unit (206) or the delay unit (208), wherein the polynomial co-efficient provided to at least one of the polynomial power calculation unit (204), the MAC unit (206) or a delay unit (208) to remove a maintenance of a shadow memory unit of the complex polynomial vector processor (102); and converting, using an inverse cordic transform unit (214), the output data generated by the delay unit (208) to the Cartesian format from the PL format to obtain the Cartesian format output data with reduced non-linearity.

7. The method as claimed in claim 6, wherein providing the high-speed data stream to the one or more programmable gains (210A-N) before and after entering to the normalized cordic transform unit (202) to increase an accuracy of the PL format bits for lesser amount of computations.

8. The method as claimed in claim 6, wherein performing, using a programmable attenuator and a programmable amplification unit, programmable attenuation and programmable amplification respectively on the high-speed data stream to reduce fixed point quantization errors of the MAC unit (206) using the one or more programmable gains (210A-N).

9. The method as claimed in claim 6, wherein the mixed signal processing design comprises a digital filter-Digital to Analog Converter-power amplifier (DAC-PA) chain for reducing non-linearity in the output data.

10. The method as claimed in claim 6, wherein applying, using delay unit (208), the generated output with reduced non-linearity to at least one of Finite Impulse Response (FIR) filters or DAC-PA chain for further processing.

11. The method as claimed in claim 6, wherein controlling, using a clock gater unit (222), the co-efficient feeder (106) to reduce a size of the instruction memory (218).

\* \* \* \* \*